(12) United States Patent
Abbasi

(10) Patent No.: US 10,788,152 B2
(45) Date of Patent: Sep. 29, 2020

(54) SEALABLE DRAIN PIPE COUPLING

(71) Applicant: Abdul Latif Abbasi, Mississauga (CA)

(72) Inventor: Abdul Latif Abbasi, Mississauga (CA)

( * ) Notice: Subject to any disclaimer, the term of this patent is extended or adjusted under 35 U.S.C. 154(b) by 202 days.

(21) Appl. No.: 15/852,368

(22) Filed: Dec. 22, 2017

(65) Prior Publication Data

US 2019/0194949 A1 Jun. 27, 2019

(51) Int. Cl.
*F16L 21/00* (2006.01)
*F16L 21/08* (2006.01)
*E04D 13/08* (2006.01)

(52) U.S. Cl.
CPC .............. *F16L 21/08* (2013.01); *E04D 13/08* (2013.01); *E04D 2013/0846* (2013.01)

(58) Field of Classification Search
CPC ....... F16L 27/107; F16L 21/00; F16L 21/005; F16L 5/02; E04D 2013/0846
USPC .................................................. 285/109, 370
See application file for complete search history.

(56) References Cited

U.S. PATENT DOCUMENTS

| | | | | |
|---|---|---|---|---|
| 3,516,446 A | * | 6/1970 | O'Hargan | F16L 55/163 285/109 |
| 4,469,467 A | * | 9/1984 | Odill | E02D 29/14 285/109 |
| 4,478,437 A | * | 10/1984 | Skinner | F16L 5/10 285/370 |
| 4,557,625 A | * | 12/1985 | Jahnke | E02D 29/14 285/109 |
| 4,685,704 A | * | 8/1987 | Kolar | F16L 21/005 285/109 |
| 5,076,618 A | * | 12/1991 | Bridges | F16L 21/022 285/370 |
| 5,150,927 A | * | 9/1992 | Skinner | F16L 5/10 285/370 |
| 5,507,500 A | * | 4/1996 | Skinner | F16L 5/02 285/370 |
| 5,549,334 A | * | 8/1996 | Zeisler | F16L 21/00 285/370 |
| 6,126,206 A | * | 10/2000 | Topf, Jr. | F16L 21/005 285/109 |

* cited by examiner

*Primary Examiner* — David Bochna
(74) *Attorney, Agent, or Firm* — Nasser Ashgriz; UIPatent Inc.

(57) ABSTRACT

The device is a drain pipe coupling to sealably couple an insert pipe with an existing drain pipe, the drain pipe coupling comprises of an elastic tubular body concentrically positioned over the insert pipe and the existing drain pipe; a first and a second retaining rings having a toroid body which is connected to a tightening tool. Turning a screw on tightening tool causes an increase or decrease of diameter of the retaining ring and deforming the elastic tubular body to sealably contact with inner surfaces of the insert pipe and the existing drain pipe.

10 Claims, 7 Drawing Sheets

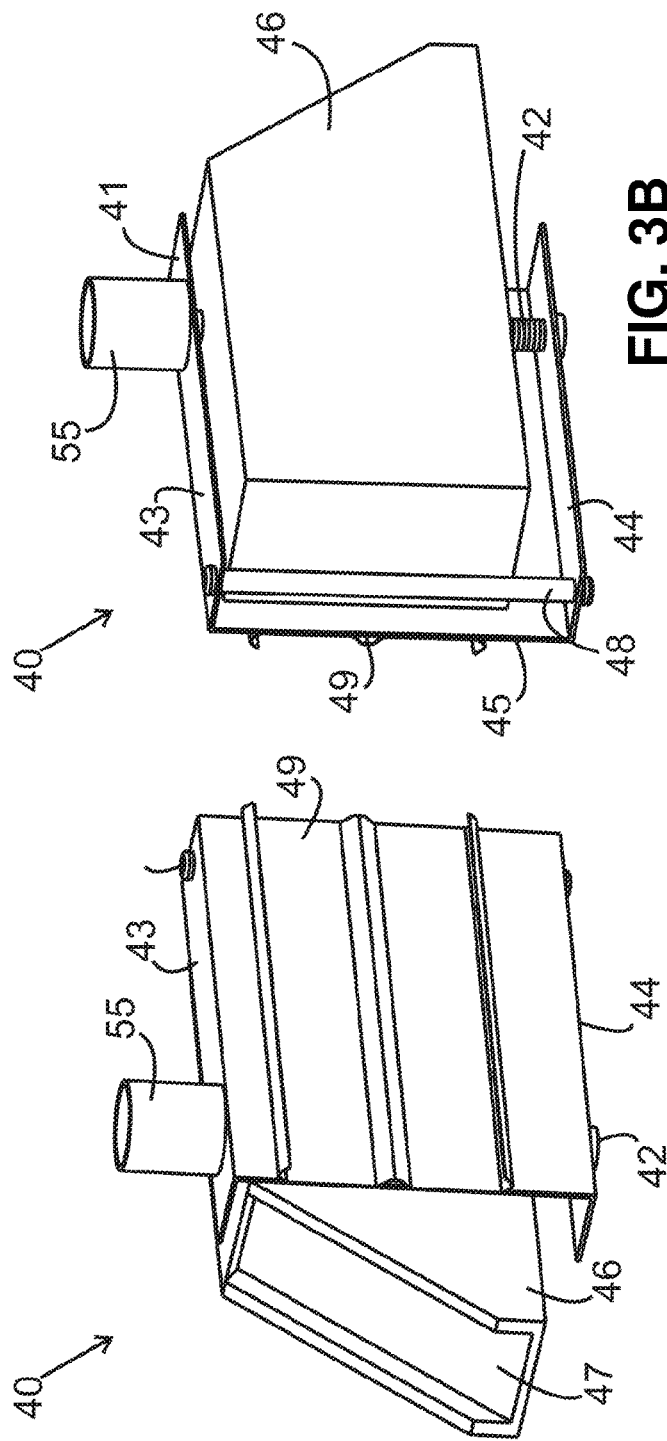

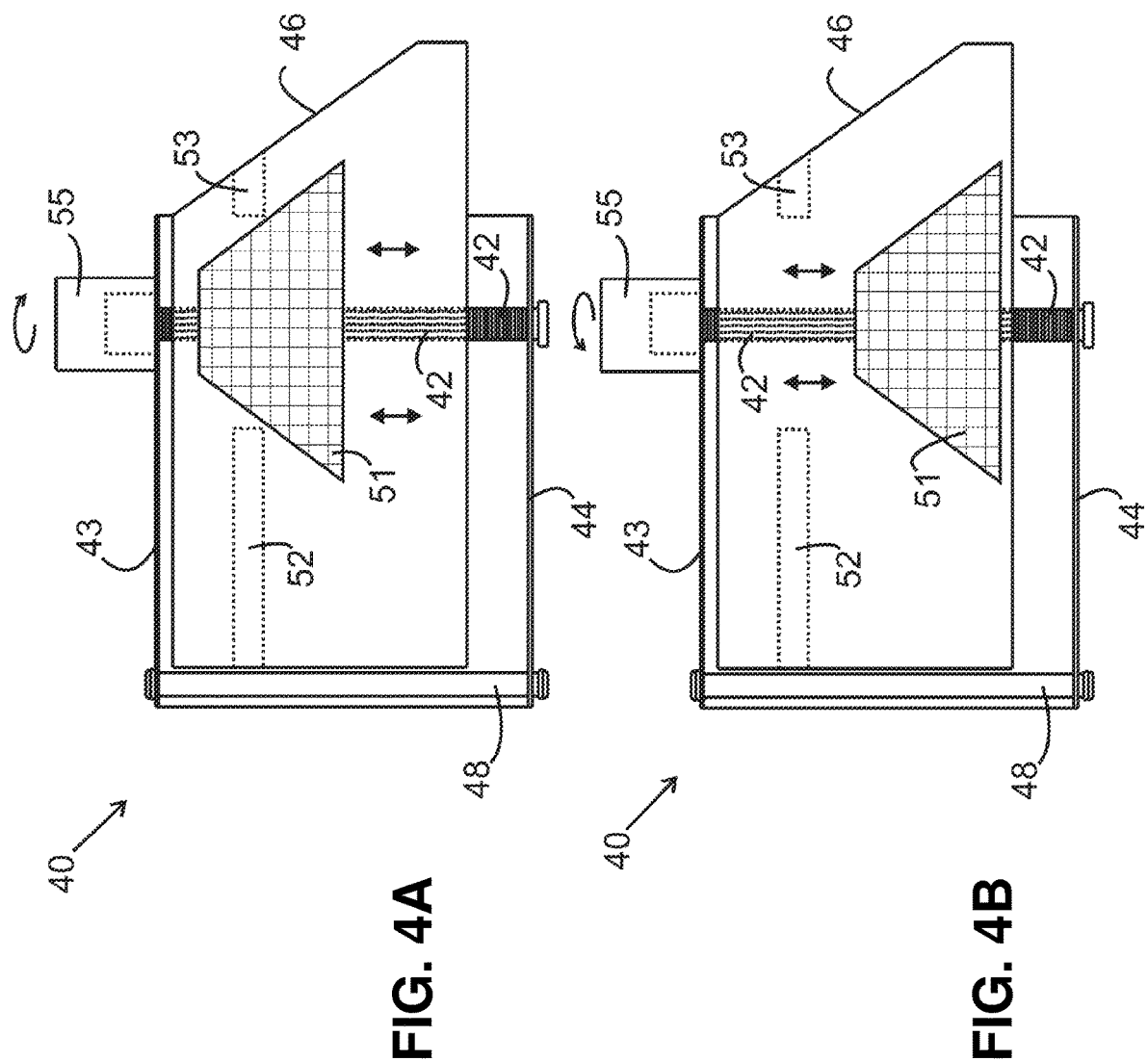

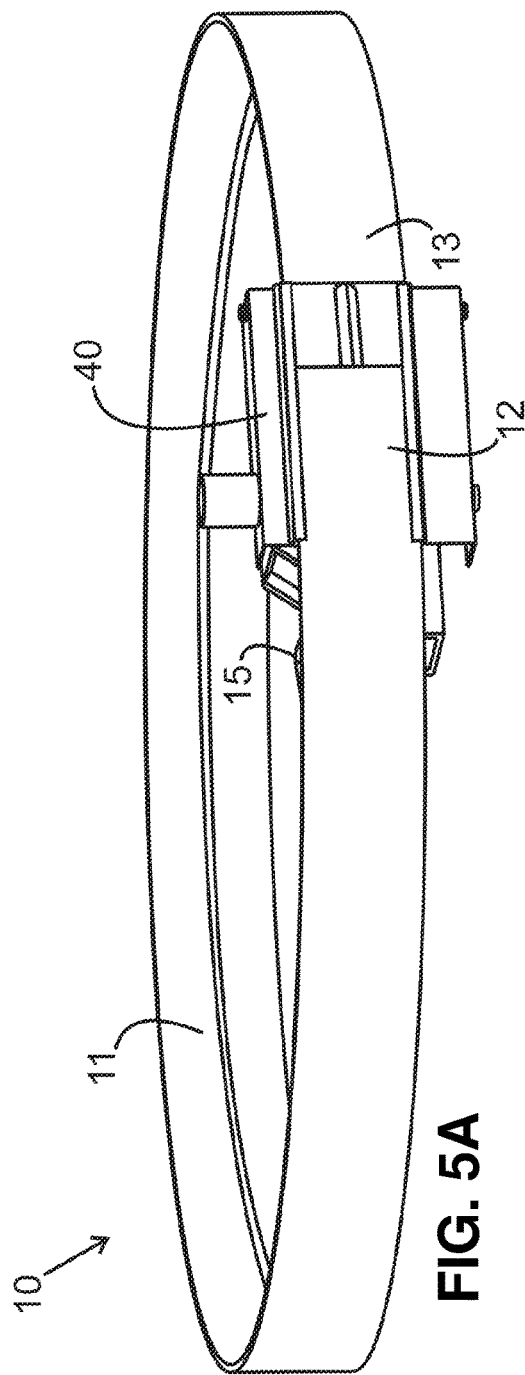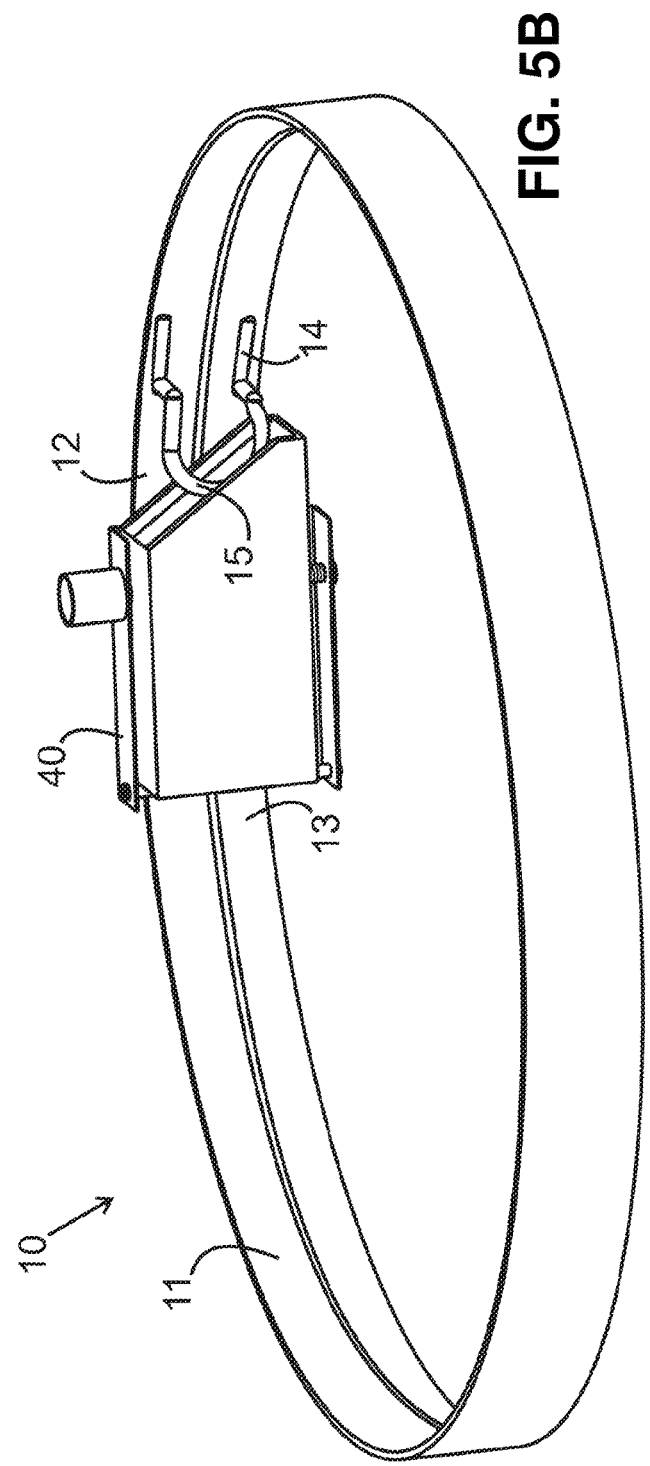

SEALABLE DRAIN PIPE COUPLING

FIELD OF THE INVENTION

The present invention relates generally to a roof drain inserts and specifically to a coupling device that sealably connects a roof drain inserts inside a drain pipe.

BACKGROUND OF THE INVENTION

A roof drain is designed in a building to remove water from the roof. The replacement and renovation on the roof surface can change the roof height during the process so the drain pipe has to be extended.

There are several methods and devices for extending of a drain pipe. One simple and low cost method is to tightly insert a smaller pipe into the drain pipe and seal the connection of two pipes with an adhesive or caulking compound. However, these types of seals are generally not reliable and there is a potential for the development of cracks and consequently water leakage.

Another alternative for sealing two pipes is a pipe coupling, which forms a sealed joint between two concentric pipes. The pipe coupling comprises of a first and a second rotating tubular member, and an elastic tubular cover concentrically positioned over both the first and the second tubular members. The pipe coupling is inserted in between the drain pipe and the insert pipe and the first member is rotated to screw into the second member. The rotation of the first member reduces the length of the coupling, compressing and deforming the elastic cover outwardly to sealably contact with the inner surfaces of the drain and insert pipe.

One drawback for using pipe coupling is that they restrict the water flow. The prior arts pipe coupling reduces the pipe cross sectional area, which causes a lower water flow. The other drawback for using pipe coupling in the prior arts is a need for specific tools to install the pipe coupling and also the installation of the pipe coupling is time consuming.

Accordingly it is an objective of the present invention to overcome these disadvantages of the prior art by providing a novel coupling device, which permits a drain insert to be securely and sealably affixed inside a drain pipe with minimal flow restriction.

SUMMARY OF THE INVENTION

The present invention is a drain pipe coupling to sealably couple an insert pipe with an existing drain pipe. The drain pipe coupling comprises of an elastic tubular body concentrically positioned over the insert pipe and the existing drain pipe and having an internal diameter appropriately sized and contoured to grip and seal the insert pipe and the existing drain pipe. A first and a second retaining rings having a toroid body, which is connected to a tightening tool from one end and is engaged with the tightening tool from the other end through a railing tool. The first and the second retaining rings are positioned at a distal end and a proximal end of the elastic tubular body to couple the insert pipe and the existing drain pipe.

The tightening tool of the present invention comprises of a housing to house a cuboid body. The cuboid body has an angled plane and wherein the cuboid body is secured in the housing with a screw and a holder pin.

The present invention further has a forcing part that engages with the screw inside the cuboid body, and wherein the forcing part moves up and down by turning the screw, and a hook connected to the toroid body in an approximate distance to the cuboid body and is placed on the angled plane.

By turning the screw, the forcing part moves up and down and forces the angled plane of the cuboid body to the hook and causes an increase or decrease of diameter of the retaining ring. The increase of diameter of the retaining ring deforms the distal and proximal end of the elastic tubular body to sealably contact with inner surfaces of the insert pipe and the existing drain pipe.

One objective of the present device is to provide an easier method of installing a drain insert, which reduces the time and effort to position the tool and install the insert.

Another objective of the present invention is to allow for tightening the device with a specific design of the tightening tool. This reduces installation time and increases productivity, while eliminating the chance that one or more screws are left loose and undetected.

Another objective of the present invention is to provide a device which is easier to manufacture and has small number of parts.

These and other objects of the present invention will become readily apparent upon further review of the following specification and drawings. To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

FIG. 3A shows a perspective view of a tightening tool of the present invention;

FIG. 3B shows a perspective view of a tightening tool of the present invention;

FIG. 3C shows a perspective view of a tightening tool of the present invention;

FIG. 4A shows a front view of a tightening tool of the present invention;

FIG. 4B shows a front view of a tightening tool of the present invention;

FIG. 5A shows a perspective view of a retaining ring of the present invention;

FIG. 5B shows a perspective view of a retaining ring of the present invention;

DETAILED DESCRIPTION OF PREFERRED EMBODIMENTS

The figures are not intended to be exhaustive or to limit the present invention to the precise form disclosed. It should be understood that the invention can be practiced with modification and alteration, and that the disclosed technology be limited only by the claims and equivalents thereof.

The invention disclosed herein, in accordance with one or more various embodiments, is described in detail with reference to the following figures. The drawings are provided for purposes of illustration only and merely depict typical or example embodiments of the disclosed invention. These drawings are provided to facilitate the reader's understanding of the disclosed invention and shall not be considered limiting of the breadth, scope, or applicability thereof. It should be noted that for clarity and ease of illustration these drawings are not necessarily made to scale.

Figure 1:
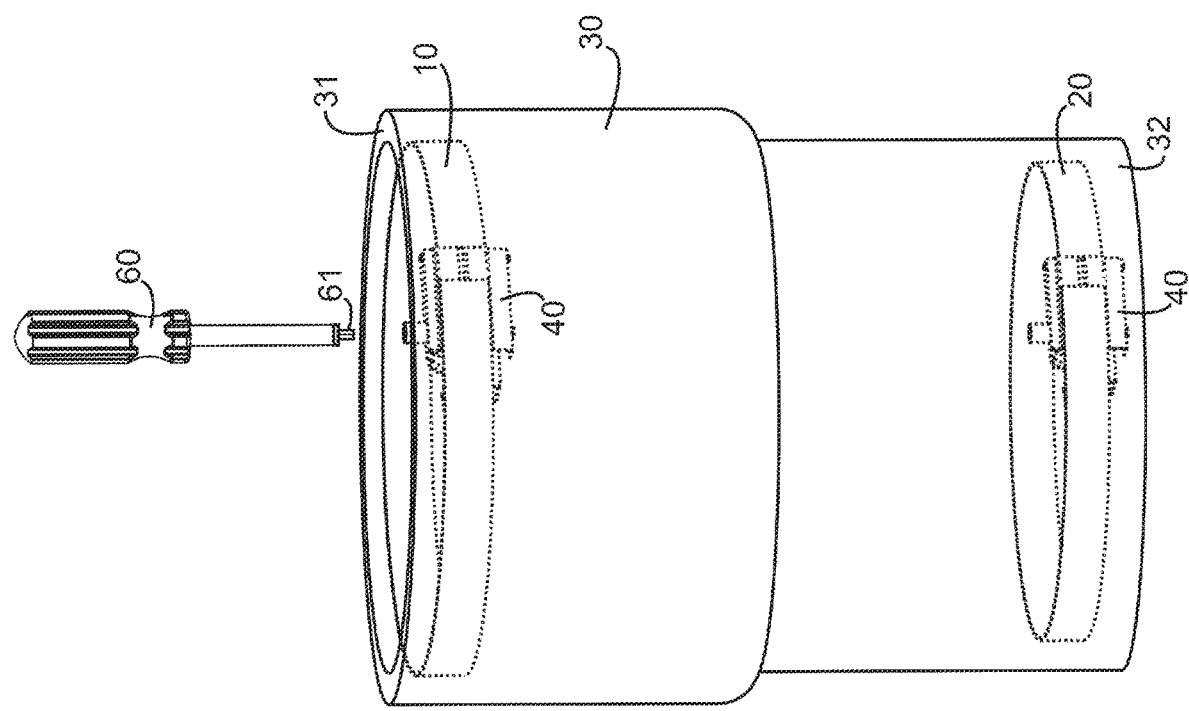
FIG. 1 shows a perspective view of the present invention.
Figure 7:
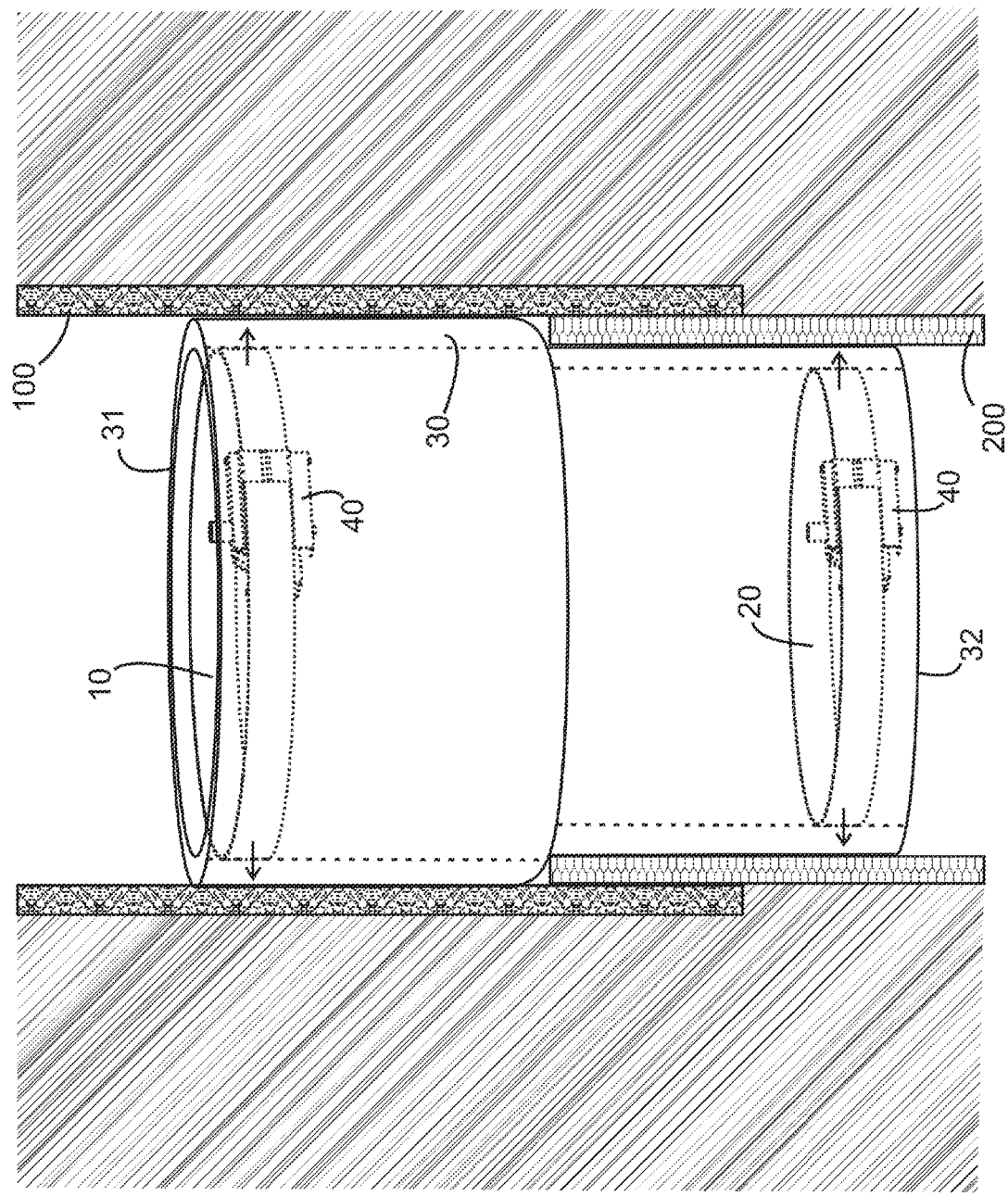
FIG. 7 shows a perspective view of the present invention after it is installed.

The present invention is a pipe coupling which forms a sealed joint between two concentric pipes. In particular, the present device is used for connecting a new pipe to an existing drain pipe of the type generally found on the roof tops. As FIGS. 1 and 7 show, the present invention comprises of two retaining ring 10, 20, an elastic tubular body 30 of rubber or similar material. The retaining ring 10, 20 are used to tight a distal end 31 and proximal end 32 of the elastic tubular body 30 to seal a new pipe 100 to an existing drain pipe 200.

Again as shown in FIG. 7, the present invention takes little space inside the existing drain pipe 200 and the new pipe 100 and flow of water has no restriction by use of the present invention.

Figure 2:
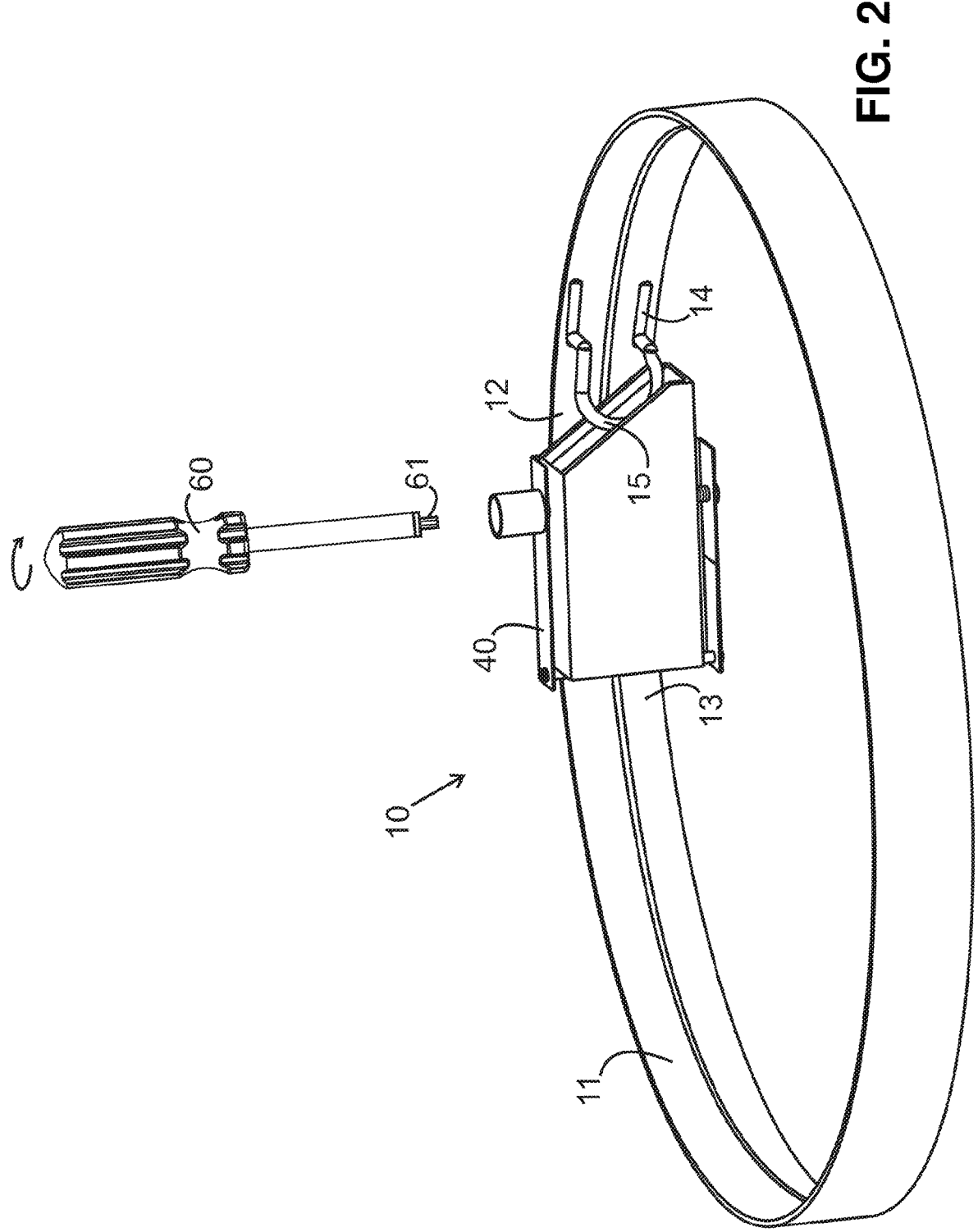
FIG. 2 shows a perspective view of a retaining ring of the present invention.
Figure 6A:
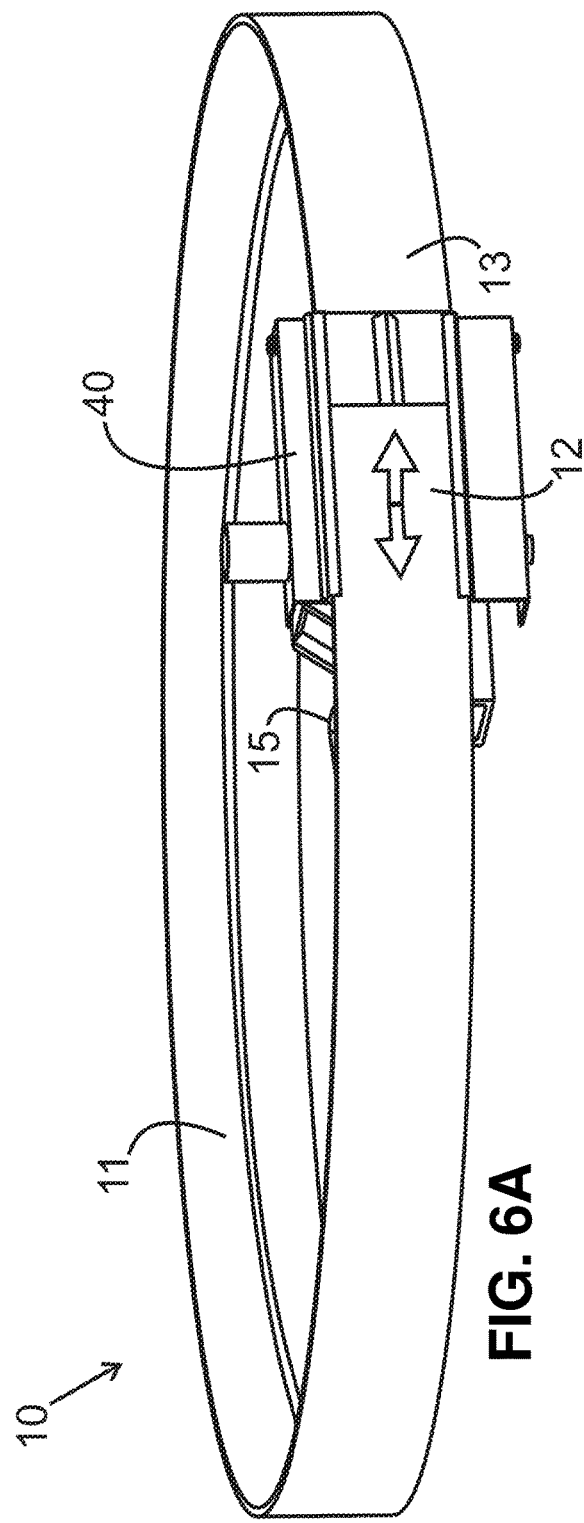
FIG. 6A shows a perspective view of a retaining ring of the present invention.
Figure 6B:
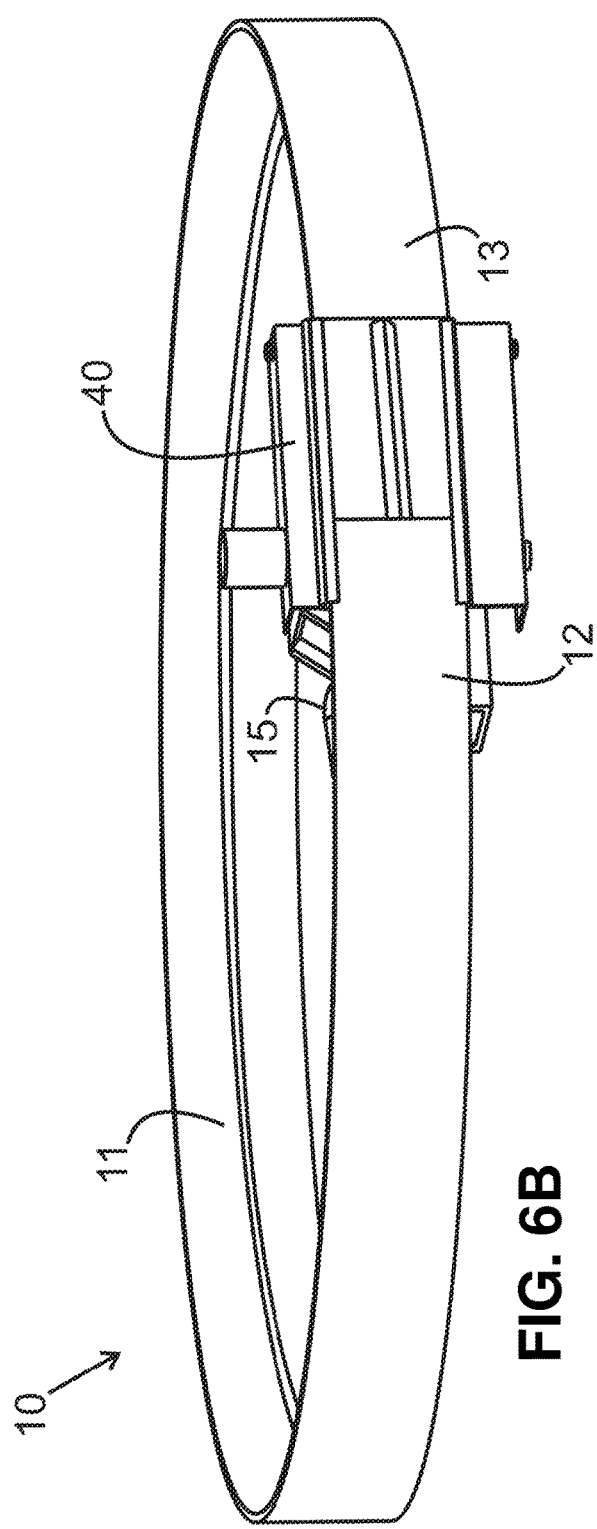
FIG. 6B shows a perspective view of a ring sealing joint of the present invention.

FIG. 2 shows a perspective view of a retaining ring 10 of the present invention. The retaining ring 10 comprises of a toroid body 11 having an open-end section 12 which is engaged with a tightening tool 40. The toroid body 11 is connected to the tightening tool 40 from one end 13. The open-end section 12 is engaged with the tightening tool 40 and by rotating a screw 42 inside the tightening tool 40 with a common screw driver 60, a hook 14 is engaged with an angled plane 47 of the tightening tool 40 and the diameter of the toroid body 11 is changed.

The hook 14 can be designed in any other shape to provide a pushing head 15 for the tightening tool 40. The hook in the present invention has a plurality of engaging pegs in order to increase contact by the angled plane. Also the slop of the angled plane 47 can be vary based on the design of the toroid body 11 and the final diameter of the toroid body 11. The slop of the angled plane 47 also moderates diameter change in the retaining ring.

FIGS. 3A, 3B, 3C, 4A and 4B show a tightening tool 40 of the present invention. The tightening tool 40 of the present invention comprises of a housing 41 having a top wall 43, a bottom wall 44 and a back wall 45 to house a cuboid body 46 having an angled plane 47. The cuboid body 46 secured in the housing with a screw 42. A holder pin 48 is connected the top wall 43 and bottom wall 44 and also holds the cuboid body 46. The tightening tool 40 of the present invention further has a railing tool 49 at back wall 45 to be engaged with the toroid body 11.

Again as shown in FIGS. 4A and 4B, the cuboid body 46 further has a forcing part 51 inside which is engaged with the screw 42. By turning the screw 42, the forcing part 51 moves up and down inside the cuboid body 46 and forces the hook 14 on the toroid body 11. A pair of stopper 52, 53 is designed in the cuboid body 46 to stop the movement of the forcing part 51.

Again as shown in FIGS. 2, 3A, 3B, 3C, 4A and 4B, the tightening tool 40 further has a guiding tube 55 attached to the top wall 43 to navigate the bottom portion 61 of the screw driver 60. The user can easily turn the screw 42 by using the guiding tube 55.

FIGS. 5A, 5B, 6A and 6B show a perspective view of the retaining ring 10 of the present invention. FIG. 5A shows the retaining ring 10 in a normal condition. The retaining ring 10 has an open-end section 12 which is engaged with a tightening tool 40. The toroid body 11 is connected to the tightening tool 40 from one end 13. The open-end section 12 is engaged with the railing tool 49 and by rotating a screw 42 inside the tightening tool 40, the hook 14 is engaged with the angled plane 47 of the tightening tool 40 and the diameter of the toroid body 11 is changed.

Again as shown in FIGS. 4A, 4B, 6A and 6B, by turning the screw 42 inside the tightening tool 40, the forcing part 51 forces the angled plane 47 into the hook 14 and cause to increase or decrease the diameter of the toroid body 11.

Movement of the open-end section 12 of the toroid body 11 inside the railing tool 49 can change the diameter of the retaining ring 10 and also push the distal and proximal ends 31, 32 of the elastic body 30 to seal the drain pipe.

FIG. 7 shows the present invention after it is installed. The elastic tubular body 30 is concentrically positioned over pipes 100, 200 as it is assembled, such that the retaining rings 10, 20 hold the elastic tubular body 30 at both ends. The retaining ring 10, 20 are used to tight the distal end 31 and the proximal end 32 of the elastic tubular body 30 to seal a new pipe 100 to an existing drain pipe 200. The installation process ensures a tight fit to the pipe.

The present invention can be used to sealably secure an insert into a roof drain pipe. The present invention is inserted into a drain pipe 100, as shown in FIG. 7. The screw 42 is turned until the retaining rings engage with the elastic tubular body 30 so that it does not slip easily. A common screw driver is used to turn screw 42 on the tightening tool 40 and to further compress the elastic 21 ody 30 into the drain pipe 200 and the new pipe 100 as shown in FIG. 7.

The toroid body 11 can be made from stainless steel material or plastic materials to provide a tight seal for the joint and also has a corrosion resistance property to increase the life time of the pipe coupling.

The tightening tool 40 also can be made from stainless steel materials or plastic materials to increase the life time of the pipe coupling.

The elastic tubular body 30 can be made of rubber or similar material (natural or synthetic, a fluid impermeable, compressible elastomeric material preferably of neoprene elastomers or rubber), which is appropriately sized and contoured to internally grip and seal the joining pipes.

The screw in the present invention can have variable type of screw heads such as flat head, Philips head, square head, hex head, or torx head.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A drain pipe coupling to sealably couple an insert pipe with an existing drain pipe, said drain pipe coupling comprising:
   a) an elastic tubular body concentrically positioned in said insert pipe and said existing drain pipe and having an internal diameter appropriately sized and contoured to grip and seal said insert pipe and said existing drain pipe;
   b) a first and a second retaining rings having a toroid body which is connected to a tightening tool at one end and is engaged with said tightening tool at another end through a railing tool, wherein said first and said second retaining rings are positioned at a distal end and a proximal end of said elastic tubular body to couple said insert pipe and said existing drain pipe,
   c) said tightening tool comprising,
      i) a housing to house a cuboid body;
      ii) said cuboid body has an angled plane and wherein said cuboid body is secured in said housing with a screw and a holder pin;
      iii) said railing tool engages and navigates said another end of said retaining ring and which is placed at a back portion of said housing;
      iv) a forcing part engages with said screw inside said cuboid body, and wherein said forcing part moves up and down by turning said screw, and
      v) a hook connected to said toroid body in an approximate distance to said cuboid body and is placed on said angled plane,
   whereby by turning said screw, said forcing part moves up and down and forces said angled plane of said cuboid body to said hook and causes an increase or decrease of diameter of said retaining ring, and whereby increase of diameter of said retaining ring deforming the distal and proximal end of said elastic tubular body to sealably contact with inner surfaces of said insert pipe and said existing drain pipe.

2. The drain pipe coupling of claim 1, wherein said tightening tool further has a guiding tube over said screw to guide a tip of a screw driver.

3. The drain pipe coupling of claim 1, wherein said elastic tubular body is made of a natural rubber, a synthetic rubber, a fluid impermeable, or a compressible elastomeric material.

4. The drain pipe coupling of claim 1, wherein said hook further has a pushing head in order to be in contact with said angled plane.

5. The drain pipe coupling of claim 1, wherein said railing tool has a width equal to the width of said retaining ring.

6. The drain pipe coupling of claim 1, wherein said cuboid body further has a pair of stoppers to stop the movement of said forcing part.

7. The drain pipe coupling of claim 6, wherein a height of said stoppers is variable to provide variable diameter change for said retaining ring.

8. The drain pipe coupling of claim 1, wherein said toroid body is made of a stainless steel material or a plastic material.

9. The drain pipe coupling of claim 1, wherein said tightening tool is made from a stainless steel material or a plastic material.

10. The drain pipe coupling of claim 1, wherein said screw comprises of a screw head and wherein said screw head is being selected from a group consisting of a flat head, a Philips head, a square head, a hex head, and a torx head.

* * * * *